H. A. ROBINSON.
AEROPLANE FITTING.
APPLICATION FILED FEB. 5, 1919.
1,358,247.
Patented Nov. 9, 1920.
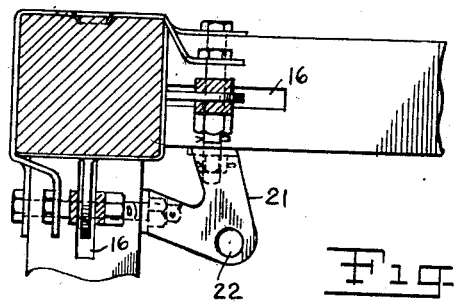
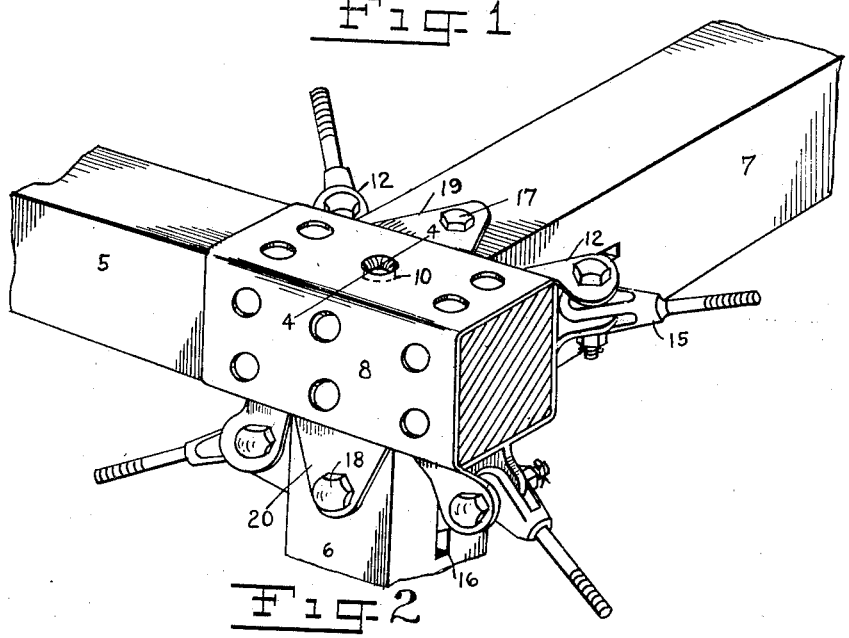
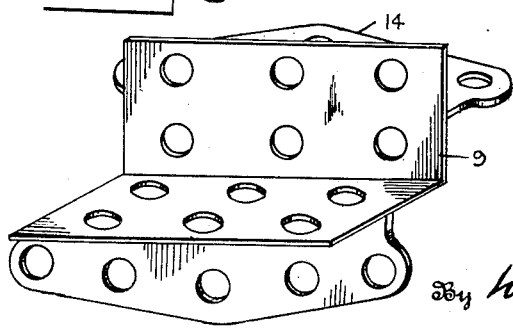
Inventor
Hugh A. Robinson.
By his Attorney

UNITED STATES PATENT OFFICE.

HUGH A. ROBINSON, OF KEYPORT, NEW JERSEY, ASSIGNOR TO AEROMARINE PLANE & MOTOR CO., INC., A CORPORATION OF NEW YORK.

AEROPLANE-FITTING.

1,358,247.  Specification of Letters Patent.  Patented Nov. 9, 1920.

Application filed February 5, 1919. Serial No. 275,105.

*To all whom it may concern:*

Be it known that I, HUGH A. ROBINSON, a citizen of the United States, residing at Keyport, in the county of Monmouth and State of New Jersey, have invented certain new and useful Improvements in Aeroplane-Fittings, of which the following is a specification, reference being had therein to the accompanying drawing.

My invention relates to improvements in aeroplane fittings and more particularly has reference to corner tie brackets and inserts.

Referring to the accompanying drawings I have illustrated in perspective in Figure 1 a suitable form of fitting embodying an application of my invention. Fig. 2 is an enlarged detail in cross-section illustrating part of said fitting. Fig. 3 is an enlarged perspective view of another complete part of said fitting, and Fig. 4 is a cross-sectional detail on the line 4—4 of Fig. 1.

5 indicates a longeron, and 6 and 7 the struts secured thereto. 8 indicates half of the tie bracket, and 9 the other half shown to better advantage in Fig. 3. The longeron 5 is preferably provided with a depressed hole 10, and the hole 11 in the part of the bracket indicated by the reference character 8, is preferably depressed to engage the depression 10 in the longeron 5 to prevent lateral shifting of the bracket as indicated to better advantage in Fig. 2. Looking at Fig. 1 the part of the bracket 8 covers the upper and left side of the longeron 5, and the part of the bracket 9 shown to better advantage in Fig. 3 covers the right side and bottom of the longeron 5, the part of the bracket 8 having lugs such as 12—13 provided with holes which are in alinement with holes in the lug 14 of the part 9 of the bracket to receive bolts for holding the stays or turnbuckles such as 15, and substantially the same arrangement is provided at the bottom of the bracket as shown, the ends of the struts 6 and 7 being kerfed or cut away as indicated at 16 to allow for the passage of the aforesaid lugs.

The bolts 17 and 18 which pass through the lugs 19 and 20 respectively of the bracket member 8 also pass through the struts 6 and 7 and engage the corner tie brackets 21 shown to better advantage in Fig. 4, thus forming a rigid, strong, though light method of securing the several parts referred to, and said corner brackets are preferably provided with holes 22 for the passage of a pin for retaining a stay member such as a turnbuckle.

Of course it will be understood that various modifications may be made in the construction and arrangement of parts without departing from the spirit of the invention as claimed.

I claim:—

1. In a fitting of the class described, a pair of bracket members adapted to encircle a longeron having lugs extending over the ends of struts adjacent thereto, and a corner bracket adjacent the ends of said struts adapted to be secured through said struts to the lugs of said bracket members.

2. In a fitting of the class described, a pair of bracket members adapted to encircle a longeron having lugs extending over the ends of struts adjacent thereto, and a corner bracket adjacent the ends of said struts adapted to be secured through said struts to the lugs of said bracket members, said corner bracket having two lugs and means in combination with said corner bracket for engaging a stay member.

In testimony whereof I hereunto affix my signature in the presence of two witnesses.

HUGH A. ROBINSON.

Witnesses:
ANNA F. DUFFY,
DAVID H. DOUGLASS.